(12) United States Patent
Smith

(10) Patent No.: US 8,548,395 B2
(45) Date of Patent: Oct. 1, 2013

(54) PUSH-TO-TALK SWITCH

(75) Inventor: Richard C. Smith, Costa Mesa, CA (US)

(73) Assignee: SureFire, LLC, Fountain Valley, CA (US)

( * ) Notice: Subject to any disclaimer, the term of this patent is extended or adjusted under 35 U.S.C. 154(b) by 695 days.

(21) Appl. No.: 11/618,317

(22) Filed: Dec. 29, 2006

(65) Prior Publication Data

US 2008/0026700 A1    Jan. 31, 2008

Related U.S. Application Data

(63) Continuation-in-part of application No. 11/493,242, filed on Jul. 26, 2006, now abandoned.

(51) Int. Cl.
     *H04B 1/38*      (2006.01)

(52) U.S. Cl.
     USPC ........................................... 455/90.2

(58) Field of Classification Search
     USPC .................. 455/90.2, 575.1, 575.2
     See application file for complete search history.

(56) References Cited

U.S. PATENT DOCUMENTS

| | | | | |
|---|---|---|---|---|
| 3,226,501 A | * | 12/1965 | Seserman | 200/52 R |
| 5,118,909 A | * | 6/1992 | Husting | 200/81 H |
| 5,923,522 A | * | 7/1999 | Sajna | 361/288 |
| 6,153,840 A | * | 11/2000 | Dreher | 200/301 |
| 6,181,254 B1 | | 1/2001 | Vogele | |
| 6,332,345 B1 | * | 12/2001 | Huang | 70/456 R |
| 7,010,275 B2 | * | 3/2006 | Davies | 455/90.2 |
| 7,110,799 B1 | | 9/2006 | Willins et al. | |
| 2001/0014618 A1 | | 8/2001 | Martin et al. | |
| 2003/0008688 A1 | * | 1/2003 | Fujino et al. | 455/569 |
| 2004/0137963 A1 | | 7/2004 | Barras et al. | |
| 2005/0064915 A1 | * | 3/2005 | Lair | 455/569.1 |
| 2005/0143140 A1 | | 6/2005 | Sanders et al. | |
| 2006/0035687 A1 | | 2/2006 | Wong et al. | |
| 2006/0050917 A1 | * | 3/2006 | Skillicorn et al. | 381/384 |
| 2006/0148425 A1 | | 7/2006 | Carlson | |
| 2007/0281725 A1 | * | 12/2007 | Hyatt | 455/519 |

OTHER PUBLICATIONS

U.S. Appl. No. 11/493,242, filed Jul. 26, 2006, Richard C. Smith.

* cited by examiner

*Primary Examiner* — Andrew Wendell
*Assistant Examiner* — David Bilodeau
(74) *Attorney, Agent, or Firm* — Haynes and Boone, LLP

(57) ABSTRACT

A push-to-talk switch can have a switch that does not produce an audible sound when actuated. For example, the push-to-talk switch can comprise a membrane switch or a capacitive switch that produces less than 0 dB(A) of wideband sound when actuated. The switch can be actuated by pushing a diaphragm. Sound damping material can be used to mitigate audibility of the switch. Because the push-to-talk switch is substantially silent, it can be used in applications such as covert operations and battle situations where the sound of actuating the switch could have life threatening consequences.

30 Claims, 5 Drawing Sheets

PUSH-TO-TALK SWITCH

RELATED APPLICATIONS

This patent application is a continuation-in-part (CIP) of U.S. patent application Ser. No. 11/493,242, filed on Jul. 26, 2006 now abandoned, and entitled Push-To-Talk Switch, the entire contents of which are hereby expressly incorporated by reference.

TECHNICAL FIELD

The present invention relates generally to electronics. The present invention relates more particularly to a substantially silent push-to-talk switch for use with portable two-way radios, such as the portable two-way radios commonly used by police officers, firemen, and soldiers.

BACKGROUND

Portable two-way radios are well known. Police officers, firemen, and soldiers commonly use portable two-way radios to communicate when performing their duties. Such radios generally require that a switch be actuated for the user to transmit a radio message. Such switches are known as push-to-talk switches.

For example, police officers are often seen using the push-to-talk button on the microphone of their two-way radio so that they can speak over the radio. Other push-to-talk switches are not built into the microphone, but rather are standalone switches that can be attached to a radio cable, such as between an earpiece and/or microphone and the two-way radio.

The cable is configured to facilitate control of the radio via the standalone push-to-talk switch. That is, pushing the button of the standalone push-to-talk switch completes a circuit through the cable so as to cause the radio to transmit in the same manner that pushing the button of the microphone does.

Standalone push-to-talk switches are generally used in critical situations, such as covert operations and firefighting. In covert operations, the push-to-talk switch can be worn beneath the clothes, e.g., under a shirt, so as to be out of sight. An earpiece can be used to enhance the ability of a user to hear received radio messages and to inhibit the ability of others to hear these messages (which can be particularly important in covert operations).

Although contemporary standalone push-to-talk switches have proven to be generally satisfactory for their intended uses, they do suffer from inherent deficiencies that detract from their overall utility. For example, when a user pushes the button of a contemporary push-to-talk switch, actuation of the switch results in an audible noise. Usually, a click can be heard when the button is depressed. This audible noise has some advantages. For example, it provides the user with positive feedback that the switch has been actuated and thus that the communication system is ready for the user to transmit.

However, in some instances, such an audible noise can be detrimental to the mission being performed by a police officer, soldier, or the like. Indeed, such audible noise can endanger the life of the user. For example, when the user is engaged in a covert operation or is otherwise attempting to remain unnoticed, an audible noise may undesirably alert others.

Because of the inherently dangerous nature of covert operations, police activities, and battlefield situations, alerting others can, in some instances, be life threatening. Therefore, it is desirable to provide a push-to-talk switch that operates comparatively quietly, e.g., silently.

BRIEF SUMMARY

A substantially silent push-to-talk switch for use by police officers, firemen, soldiers, and the like is disclosed. According to an example of an embodiment of the present invention, the substantially silent push-to-talk switch can comprise a switch that is substantially silent, e.g., does not produce an audible sound when actuated.

According to an example of an embodiment of the present invention, the push-to-talk switch can comprise a housing and a switch disposed substantially within the housing. The housing can be configured so as to reduce the sound of the switch such that the switch is not audible when actuated.

According to an example of an embodiment of the present invention, the push-to-talk switch can comprise a housing and a switch disposed substantially within the housing. Sound damping/insulating material can be disposed within the housing so as to reduce the sound of the switch such that the switch is not audible when actuated.

According to an example of an embodiment of the present invention, the push-to-talk switch can produce a wideband sound pressure level of less than 0 dB(A) at 36 inches when actuated. This is approximately below the threshold of hearing. For example, the push-to-talk switch can comprise a switch that itself produces a wideband sound pressure level of less than 5 dB(A) at 36 inches when actuated. Sound damping/insulation can reduce the sound of the push-to-talk switch even further.

According to an example of an embodiment, the present invention can comprise an inline cable assembly for a portable two-way radio. The inline cable assembly can comprise an inline cable configured to provide electrical communication between an earpiece, a microphone, a portable two-way radio and a push-to-talk switch.

The push-to-talk switch can comprise a diaphragm. The switch can be configured to be actuated by pushing the diaphragm. For example, pushing the diaphragm can cause the diaphragm to abut the switch so as to actuate the switch.

According to an example of an embodiment, the present invention can comprise a portable two-way radio system comprising a portable two-way radio, a microphone, an earpiece, and a push-to-talk switch. An inline cable assembly can facilitate electrical communication between the two-way radio, the microphone, the earpiece, and the push-to-talk switch. The push-to-talk switch can be part of the inline cable assembly. The push-to-talk switch can comprise a diaphragm and a switch that is configured to be actuated by pushing of the diaphragm. A switch of the push-to-talk switch can be substantially silent and/or sound damping/insulation can be used to mitigate sound from the switch.

According to an example of an embodiment, the present invention can comprise a method for making a push-to-talk switch. The method can comprise providing a diaphragm and a housing; attaching the diaphragm to the housing; and placing a switch within the housing such that pushing the diaphragm actuates the switch. The switch can be substantially silent and/or sound damping/insulation can be used to mitigate sound from the switch.

According to an example of an embodiment, the present invention can comprise a method for operating a push-to-talk switch. The method can comprise pushing a diaphragm, wherein the diaphragm effects actuation of a switch and wherein actuation of the switch does not produce an audible sound.

Benefits of the substantially silent push-to-talk switch or one or more embodiments of the present invention include enhanced suitability for use in situations wherein noise could undesirably alert others and thus jeopardize the safety of the user. This invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
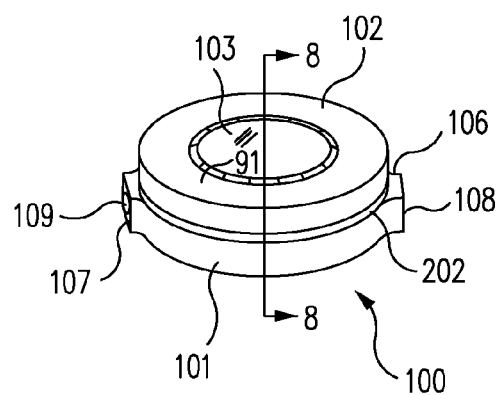
FIG. 1 is a semi-schematic perspective view of a push-to-talk switch for use by police officers, soldiers, firemen, and the like, according to a example of an embodiment of the present invention.

Systems and methods are disclosed herein to provide a push-to-talk switch that is substantially silent. More particularly, an example of an embodiment of the present invention comprises a push-to-talk switch comprising a switch that does not produce an audible sound when actuated. For example, the switch can comprise a capacitive switch or a membrane switch.

A housing of the push-to-talk switch can be configured so as to mitigate sound from the switch. For example, sound damping/insulating material can be disposed within the housing so as to mitigate sound from the switch disposed therein. The housing itself can have sufficient sound damping and/or insulating properties so as to mitigate sound from the switch disposed therein. Any combination of quietness of the switch, the use of sound damping/insulating material, and sound damping/insulating provided by the housing may be used to provide a substantially silent push-to-talk switch.

More particularly, the present invention can comprise a switch that produces a sound level below the threshold of hearing, i.e., a sound pressure level of less than approximately 0 dB(A) of wideband sound at 36 inches, can be used. For example, a switch that produces a sound pressure level of less than 5 dB(A) of wideband sound at 36 inches can be used. As used herein, a wideband sound can be an integration of sound from 20 Hz to 20 kHz.

As mentioned above, a sound damping and/or sound insulating material can be configured so as to mitigate audibility of the switch. For example, the sound damping/insulting material can be configured so as to generally surround the switch. The sound damping/insulating material can be used with a switch that would otherwise produce an audible sound. Thus, sound damping/insulating material can facilitate the use of a switch that would otherwise be too loud.

Alternatively, sound damping/insulating material can be used with a switch that is already inaudible when actuated. This can be done to further reduce the sound level and/or to help keep the sound level of the switch within an acceptable range if the switch malfunctions or otherwise operates at a louder than anticipated level, such as due to over zealous use.

As mentioned above, the housing of the push-to-talk switch can be constructed so as to provide sufficient sound damping/insulation. For example, the housing can be made to be thick enough, or have structures or materials that provide sufficient sound damping/insulation so as to make operation of the switch inaudible. Thus, a louder switch can be used.

The switch can be mounted upon a printed circuit board. The switch can be actuated by pressing a diaphragm. For example, a membrane switch can be mounted upon a printed circuit board that is disposed within a housing and the diaphragm can be mounted about its periphery to the housing such that pressing the diaphragm causes the diaphragm to deform and press the membrane switch. Alternatively, the diaphragm can be omitted and the membrane switch can be actuated directly, e.g., without a structure (such as the diaphragm) between the switch and the user (such as the user's finger).

The switch can be actuated by touching an electrode, almost touching an electrode, causing something else to touch an electrode, or causing something else to almost touch an electrode. For example, a capacitive switch can be mounted upon a printed circuit board that is disposed within a housing and the diaphragm can be mounted about its periphery to the housing such that pressing the diaphragm causes the diaphragm to deform and actuate the capacitive switch. Conductive material within or attached to the diaphragm can effect such actuation of the capacitive switch. Alternatively, the diaphragm can be omitted and the capacitive switch can be actuated directly, e.g., without a structure (such as the diaphragm) between the switch and the user (such as the user's finger).

Sufficient room can provided within the housing for an electrical cable to pass through the housing between the circuit board and the housing. By providing such room in the housing, use of the press-to-talk switch in an in-line cable assembly is facilitated. That is, the press-to-talk switch can readily be placed along a cable assembly rather than at one end thereof.

The push-to-talk switch can optionally comprise a bezel that is configured so as to guide a user's finger to the button. In this manner, reliability of operation (particularly in adverse circumstances such as a gunfight) is enhanced. Quieter operation of the push-to-talk switch may also be facilitated by use of the bezel because it may mitigate noisy fumbling with the push-to-talk switch as a user attempts to actuate the push-to-talk switch, particularly in stressful situations. More reliable and quieter operation of the push-to-talk switch can save a user's life is such circumstances.

The push-to-talk switch can comprise an aluminum or polymer housing. The use of such a housing (particularly of an aluminum housing) enhances the durability thereof. Enhancing the durability of the push-to-talk switch can be particularly useful in adverse environments, such as a battlefield.

An example of an embodiment of the present invention is an inline cable assembly for a portable two-way radio. The inline cable assembly can comprise an inline cable configured to provide electrical communication between an earpiece, a microphone, a portable two-way radio, and a push-to-talk switch. The push-to-talk switch can comprise a diaphragm and a switch that is configured to be actuated by pushing of the diaphragm, wherein the switch does not produce an audible sound when actuated.

An example of an embodiment of the present invention is a portable two-way radio system. The portable two-way radio system can comprise a portable two-way radio; a microphone; an earpiece; and an inline cable assembly for facilitating electrical communication between the two-way radio, the microphone, the earpiece, and the push-to-talk switch. The push-to-talk switch can be part of the inline cable assembly. The push-to-talk switch can comprise a diaphragm and a switch that is configured to be actuated by pushing of the diaphragm, wherein the switch does not produce an audible sound when actuated.

An example of an embodiment of the present invention is a method for making a push-to-talk switch. The method can comprise providing a diaphragm and a housing; attaching the diaphragm to the housing such that the diaphragm is supported about a peripheral portion the diaphragm; and placing a switch within the housing such that pushing the diaphragm actuates the switch. The switch does not produce an audible sound when actuated.

An example of an embodiment of the present invention is a method for operating a push-to-talk switch. The method can comprise pushing a diaphragm and the diaphragm effecting actuation of a switch. Actuation of the switch does not produce an audible sound.

An example of an embodiment of the present invention is a push-to-talk switch wherein the push-to-talk switch comprises means for switching, the switching means not producing an audible sound when actuated. Means for actuating the switching means can be a diaphragm or other structure that is operated by a user.

An example of an embodiment of the present invention is an inline cable assembly for a portable two-way radio. The inline cable assembly can comprise means for providing electrical communication between an earpiece, a microphone, and a portable two-way radio and means for effecting transmission of the two-way radio. The effecting means can comprise means for switching. The switching means does not produce an audible sound when actuated.

An example of an embodiment of the present invention is a portable two-way radio system. The portable two-way radio system can comprise a portable two-way radio; a microphone; an earpiece; means for providing electrical communication between the earpiece, the microphone, and the portable two-way radio; means for effecting transmission of the two-way radio, the effecting means comprising means for switching, wherein the switching means does not produce an audible sound when actuated; and means for actuating the switching means.

As used herein, a membrane switch can be a circuit printed on a polyethylene terephthalate (PET) or indium tin oxide (ITO). For example, a membrane switch can comprise multiple layers of PET. The layers can be configured so as to effect shorting of electrodes of the switch when actuated.

Such switches are commonly used on the control panels of home appliances such as microwave ovens, air conditioners, and television remote controls. Membrane switches are typically very quiet when actuated. However, some membrane switches have an internal dome structure that provides tactile and/or audible feedback of actuation to a user. Generally, membrane switches lacking such audible feedback can be used in embodiments of the present invention. Membrane switches having tactile feedback may be used in embodiments of the present invention.

However, membrane switches having audible feedback can be used in embodiments of the present invention. For example, a membrane switch having such audible feedback can be used and sound damping/insulation material and/or a housing have sound damping/insulation properties can be used to mitigate the feedback sound.

Capacitive switches comprise an electrode. Touching or almost touching the electrode cause a change in capacitance that is sensed so as to effect actuation of the switch. The electrode can be covered with an insulator, such that it is not exposed. Capacitive switches are commonly used in elevators to select the floors at which the elevator stops.

According to one aspect of the present invention, the push-to-talk switch is configured such that the switch is more likely to actuate when pushed near the edge of the button (the top of the button proximate its perimeter, rather than at the center thereof) or at an angle (rather than perpendicularly), as compared to contemporary push-to-talk switches. According to one aspect of the present invention, the push-to-talk switch has an enhanced bevel that tends to ensure that the switch is actuated when an attempt to depress the button thereof is made. According to one aspect of the present invention, noise produced by the push-to-talk switch is mitigated by using a membrane or capacitive switch rather than a spring switch.

Referring now to FIG. 1, according to one aspect of the present invention a push-to-talk switch 100 comprises a housing 101, a bezel 102 attached to housing 101, and a button 103 disposed within bezel 102. Push-to-talk switch 100 can be used by police officers (particularly when involved in covert operations) and firemen to facilitate use of a portable two-way radio.

For example, a covert police officer can wear push-to-talk switch 100 underneath a shirt so that it is hidden from view. A small, unobtrusive microphone can be hidden, such as beneath the collar. An unobtrusive earpiece can be worn to facilitate listening to received radio communications. The portable two-way radio can be worn on the belt and hidden beneath a jacket. In this manner, the officer's ability to communicate by radio is not apparent to casual observers.

When an officer wants to transmit a radio communication, button 103 of the push-to-talk switch 100 can be pushed through the officer's shirt. Wide, sloped bezel 102 guides the user's finger to button 103 so as to assure proper actuation of the switch. As discussed in detail below, the width and slope of bezel 102 are configured so as to enhance the ability thereof in such guiding. Thus, undesirable and potentially noisy fumbling when using the push-to-talk switch can be mitigated.

As also discussed in detail below, button 103 can be configured so that the switch is more likely to be actuated regardless of the direction or angle with which a finger presses button 103. Contemporary standalone push-to-talk switches should be pressed normally (orthogonally), proximate the center thereof, in order to assure reliable actuation of the switch. Pressing the button of a contemporary push-to-talk switch normally near an edge thereof, or at an angle (particularly near the edge thereof) does not result in reliable operation of the switch. However, pressing button 103 of the present invention normally near the center thereof, normally near an edge thereof, at an angle (either near the center or the edge) is more likely to result in actuation of the switch than is the case with a contemporary push-to-talk switch.

Housing 101 can have bosses 106 and 107 formed thereon. One boss 106 can be longer than the other boss 107. Alternatively, both bosses can be the same size. Bosses 106 and 107 can be diametrically opposed about housing 101. Alternatively, bosses 106 and 107 can have any other desired orientation. For example, bosses 106 and 107 can be perpendicular with respect to one another. Any desired number of bosses can be used. Thus, one, two, three, four, or more bosses can be used.

Openings 108 and 109 can be formed in bosses 106 and 107 to facilitate the passage of one or more cables through housing 101. Such a cable can, for example, provide electrical communication between a switch disposed within housing 101 and a portable two-way radio. The cable can also provide electrical communication between the two-way radio and a microphone and/or earpiece. Thus, the cable can pass through housing 101 and/or can provide electrical connection to circuitry within housing 101. A sealant, such as RTV (room temperature vulcanizing) silicone rubber can be used to provide a water resistant seal between any cable(s) passing through openings 108 or 109 and housing 101.

An o-ring 202 can provide a seal between bezel 102 and housing 101. Alternatively, any other desired means for providing a seal can be used. For example, silicon sealant can be used to provide the seal. Bezel 102 can be removably attached to housing 101, such as via threads. Bezel 102 can be attached to housing 101 by other methods, such as a friction fit. Alternatively, bezel 102 can be permanently attached to housing 101.

Housing 101 and bezel 102 can be formed from aluminum. Housing 101 and bezel 102 can comprise anodized aluminum. Housing 101 and bezel 102 can be formed by machining. Alternatively, housing 101 and bezel 102 can comprise a rigid polymer material or any other desired material. Housing 101 and bezel 102 can be formed by injection molding.

Button 103 can be part of a diaphragm that seals housing 101, as discussed in detail below. Alternatively, the button and the diaphragm can be two separate components of the push-to-talk switch. Button 103 (and diaphragm 401 of FIG. 5) can be formed of a resilient polymer such as rubber.

Figure 8:
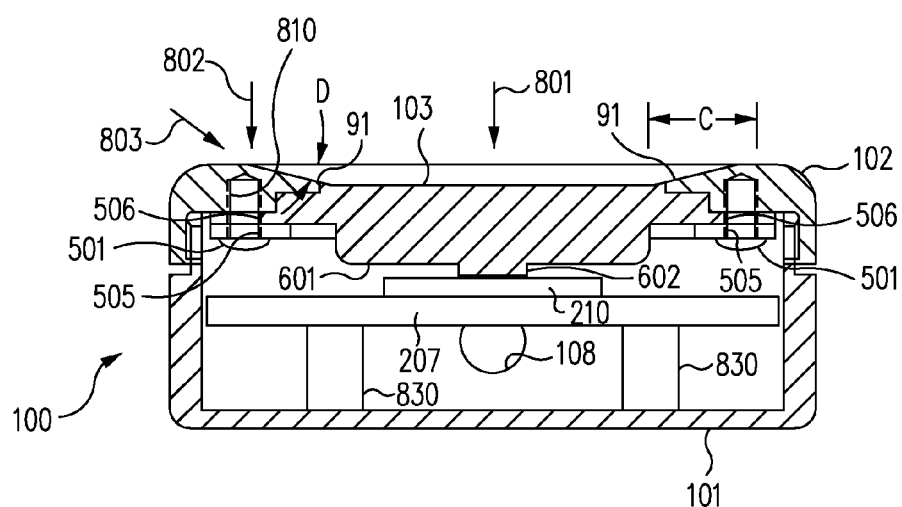
FIG. 8 is a semi-schematic cross-sectional view taken along line 8 of FIG. 1.

As mentioned above, bezel 102 can be sloped (as best seen in FIG. 8) such that it tends to guide a finger toward button 103. Thus, bezel 102 makes it easier to push button 103. This can be important when push-to-talk switch 100 is worn beneath the user's clothing. It can also be important in hostile situations, such as when a user is being fired upon and is frantically trying to push the button while defending himself.

Figure 2:
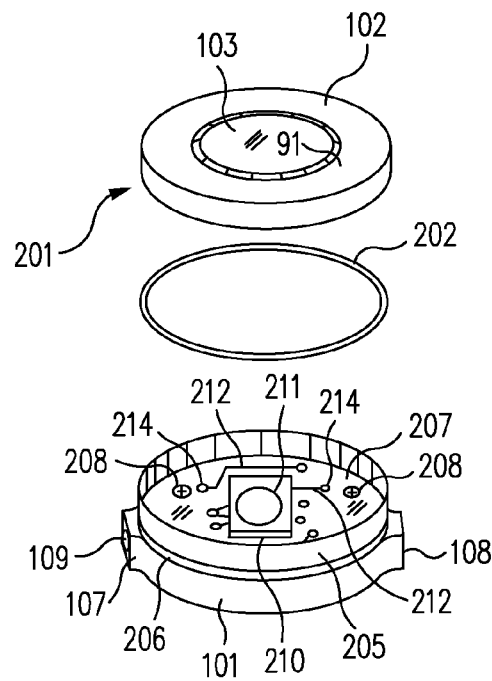
FIG. 2 is a semi-schematic exploded view of the push-to-talk switch of FIG. 1, showing the bezel assembly and o-ring removed from the housing so as to provide a view of the interior thereof.

Referring now to FIG. 2, a bezel assembly 201 comprises bezel 102, button 103, and other parts as discussed in detail below. Bezel assembly 201 can screw onto housing 101, such as via external threads 205 formed on housing 101 and corresponding internal threads 405 (FIG. 4) formed inside bezel 102. When bezel assembly 201 is screwed onto housing 101, o-ring 202 can be captured therebetween. An o-ring groove 206 formed in housing 101 can receive o-ring 202 and can help to retain o-ring 202 in place when bezel assembly 201 is removed from housing 101.

A printed circuit board 207 can be mounted within housing 101, such as via screws 208. A substantially silent switch, such as membrane or capacitive switch 210, can be mounted to printed circuit board 207. Switch 210 can have a membrane or sensor 211. For example, if switch 210 is a membrane switch, then it can have a membrane 211 that actuates switch 210 when pressed, such as by diaphragm 401. Sound damping/insulating material can be used to mitigate sound from switch 210, as discussed below.

As a further example, if switch 210 is a capacitive switch, then it can have an electrode or sensor 211 that effects an change in capacitance, such as when diaphragm 401 is touching or proximate to sensor 211. Diaphragm 401 can comprise a conductive, e.g., metallic, material so as to effect such a change in capacitance. For example, metal (such as iron filings) can be added to diaphragm or a piece of metal can be attached thereto (such as on the underside thereof).

Traces 212 can be formed on printed circuit board 207 to facilitate electrical interconnection of wires from a cable 901 (FIG. 9) with switch 210. For example, wires from cable 901 can be soldered into through holes 214 to facilitate such electrical connection.

As those skilled in the art will appreciate the use of a membrane or capacitive switch 210, rather than a spring switch (as is used in contemporary push-to-talk switches) which provides a substantial advantage with respect to noise. Spring switches are typically comparatively noisy and can produce a noise level well above the threshold of hearing, even at a distance of several yards. Indeed, according to contemporary practice the noise level of such switches can be considerable so as to provide positive auditory feedback of actuation to users.

Figure 3:
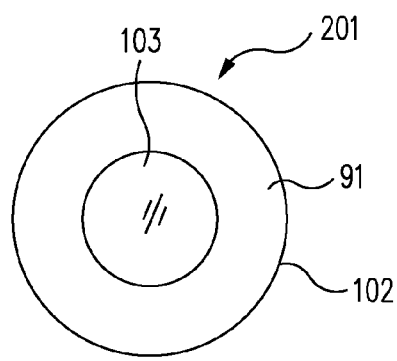
FIG. 3 is a semi-schematic top view of the bezel assembly of FIG. 2, showing a button formed by the diaphragm thereof.

Referring now to FIG. 3, button 103 can be round and can be centrally located within bezel 102. Alternatively, button 103 and bezel 102 can have any other desired configuration. For example, button 103 and/or bezel 102 can be generally rectangular in shape.

Figure 4:
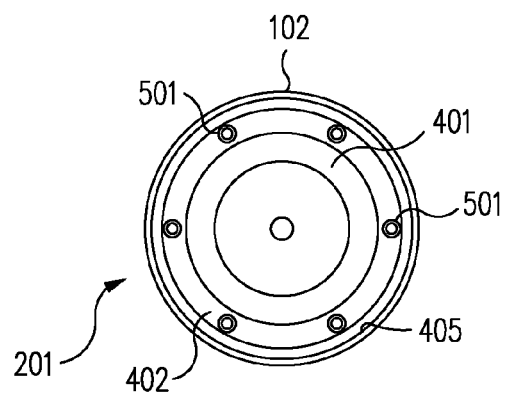
FIG. 4 is a semi-schematic bottom view of the bezel assembly of FIG. 2, also showing the bottom of the diaphragm.
Figure 5:
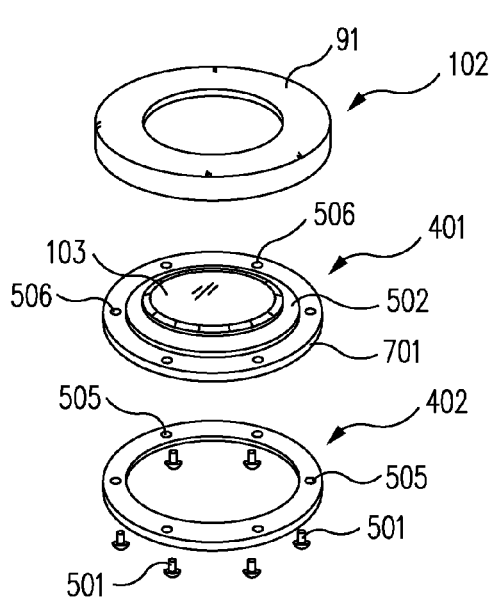
FIG. 5 is a semi-schematic exploded perspective view of the bezel assembly of FIG. 2, showing a top view of the diaphragm and showing the retainer removed from the bezel.

Referring now to FIGS. 4 and 5, bezel assembly 210 comprises a diaphragm 401 that is attached to bezel 102. Diaphragm 401 can be attached to bezel 102 using retainer 402. Retainer 402 can be shaped generally like a washer and can be formed of aluminum. Alternatively, retainer 402 can be formed of a substantially rigid polymer material or any other desired material.

Diaphragm 401 can have button 103 formed integrally therewith. For example, diaphragm 401 and button 103 can be formed of rubber and molded as a single item. Alternatively, diaphragm 402 and button 103 can be formed of a resilient polymer material or any other desired material and can be either integrally or separately formed.

Retainer 402 can be configured as a washer that has a plurality of holes 505 therein such that retainer 402 can capture a peripheral portion of diaphragm 401 between itself and bezel 102 and such that a plurality of screws 501 can be used to attach diaphragm 401 to bezel 102. Screws 501 can pass through unthreaded holes 505 in retainer 402 and through unthreaded holes 506 in diaphragm 401 and then be received into threaded holes 810 (FIG. 8) formed in bezel 102.

Diaphragm 401 can have an intermediate portion 502. The thickness of intermediate portion 502 can be greater than the thickness of peripheral portion 701 and less than the thickness of button 103. Intermediate portion 502 can have a thickness that, at least in part, defines the amount of force required to push button 103 sufficiently so as to actuate switch 210.

Button 103 can comprise a thicker portion of diaphragm 401. The thicker portion of diaphragm 401 that defines button 103 can be thicker than intermediate portion 502. Button 103 can be the thickest portion of diaphragm 401.

Figure 6:
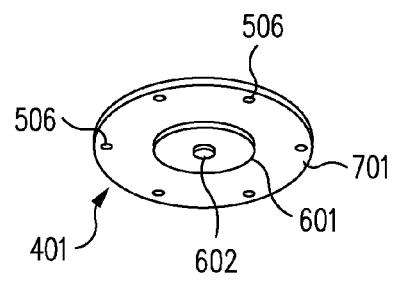
FIG. 6 is a semi-schematic perspective view showing the bottom of the diaphragm of FIG. 5.
Figure 7:
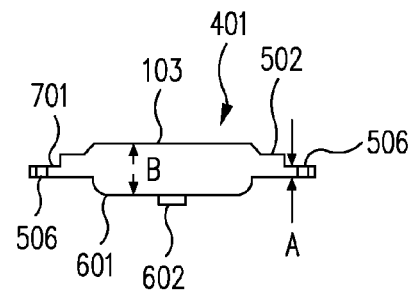
FIG. 7 is a semi-schematic side view of the diaphragm of FIG. 5, showing differences in the thickness of the thicker central portion and the less thick peripheral portion thereof.

Referring now to FIGS. 6 and 7, the bottom of diaphragm 401 can comprise a thicker portion 601 that corresponds generally in position to the thicker portion of diaphragm 401 that defines button 103. That is, button 103 can be defined by an increase in the thickness of diaphragm 401 that extends both upwardly (above peripheral portion 701) and downwardly (below peripheral portion 701). Alternatively, button 103 can be defined by an increase in the thickness of diaphragm 401 that extends either upwardly (above peripheral portion 701) or downwardly (below peripheral portion 701), but not both.

The rigidity of button 103 and the resilience of peripheral portion 701 depend upon the material selected and the thickness thereof. Thus, increasing the thickness of peripheral portion 701 and/or button 103 can increase the rigidity thereof. Button 103 can have sufficient rigidity (such as by having sufficient thickness) so as to effect actuation of switch 210 regardless of where on button 103 it is pushed and with less regard as to the angle at which button 103 is pushed.

A nipple 602 can extend from the lower surface of diaphragm 401 to facilitate contact with membrane or sensor 211 of switch 210. Thus, when button 103 is pushed, then nipple 602 presses downwardly against membrane or sensor 211, so as to effect actuation of switch 210. The length of nipple 602 can be adjusted, either in manufacture of diaphragm 401 or in assembly of push-to-talk switch 100, so as to properly effect actuation of switch 210. For example, nipple 602 can be formed during manufacture to have excessive length and can be trimmed during assembly to have the desired length, thereby compensating for variations in the construction and mounting of switch 210. Nipple 602 can be formed of a metallic or other material that effects actuation of a capacitive switch (when a capacitive switch is used).

A peripheral portion 701 of diaphragm 401 can have a thickness, Dimension A, that is between approximately 0.010 inch and 0.100 inch thick. The peripheral portion 701 can have a thickness, Dimension A, that is approximately 0.040 inch thick. The peripheral portion 701 can be captured intermediate retainer 402 and bezel 102. Peripheral portion 701 provides at least some of the flexibility and resilience that facilitates movement of button 103.

The thicker portion defines button 103 and can have a thickness, Dimension B, that is between approximately 0.10 inch and 0.35 inch thick. The thicker portion can have a thickness, Dimension B, that is approximately 0.25 inch thick. Generally, the thicker portion is thick enough to facilitate use thereof as a button. Thus, the thicker portion is thick enough to provide sufficient rigidity to facilitate use thereof as a button.

Referring now to FIG. 8, a cross-sectional view better shows the sloped portion 91 of bezel 102. Sloped portion 91 can have a width, Dimension C, that is between approximately 0.25 inch and approximately 2.0 inch. Sloped portion 91 can have a width, Dimension C, that is approximately 0.75 inch. Sloped portion can have an angle, Angle D, that is between approximately 35° and approximately 55°. Sloped portion 91 can have an angle, Angle D, that is approximately 45°. The button 103 and the bezel 102 can cooperate to define a recess and the button can be at a bottom of the recess.

The width, Dimension C, and the angle, Angle D, of sloped portion 91 are configured so as to enhance the ability of a user to actuate the push-to-talk switch of the present invention. Thus, it is substantially more likely that an attempt to actuate the switch will actually result in the ability of the user to transmit a radio message. As those skilled in the art will appreciate, such ability can have life and death consequences. There are times when the ability to rapidly and reliably transmit radio messages can have an important impact upon police and firefighter operations.

Printed circuit board 207 can be mounted to housing 101 via standoffs 830. Screws 208 (FIG. 2) can mate with threads formed in standoffs 830. Standoffs 830 can define the distance between housing 101 and printed circuit board 207. The distance between housing 101 and printed circuit board 207 can be sufficient for one or more electrical cables (such as 901 of FIG. 9) to pass therebeneath. This distance can be varied so as to accommodate the desired amount of cabling within housing 101.

Alternatively, the diaphragm can be flat, e.g. generally constant in cross-section. Indeed, the diaphragm can have any desired configuration. A structure other than a diaphragm can be used to actuate the switch or the switch can be actuated directly (without the use of an intermediate structure between the user and the switch). For example, a rigid button or button-like structure (rather than an at least somewhat flexible diaphragm) can be pressed by the user and can in response press and thereby actuate the switch.

Alternatively, the bezel can be non-slopped, e.g., flat. Indeed, the bezel can have any desired configuration and can be absent altogether.

Figure 9:
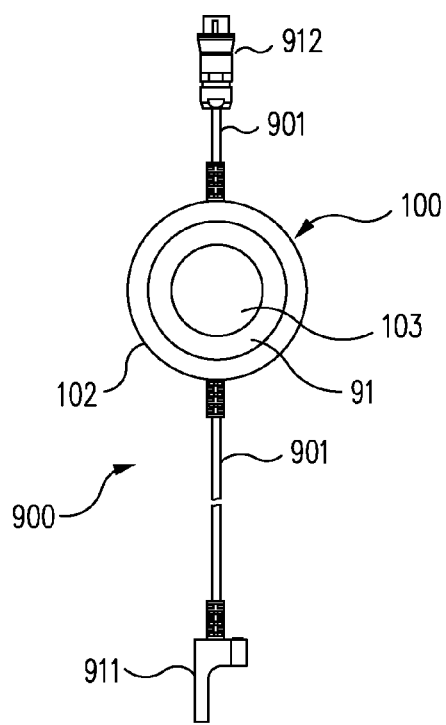
FIG. 9 is a semi-schematic view of an inline cable assembly using a push-to-talk switch according to an exemplary embodiment of the present invention.

Referring now to FIG. 9, an inline cable assembly 900 can comprise a push-to-talk switch 100 such as that of FIGS. 1-8. A side mount 911, for example, can be attached to the lower end of cable 901 to facilitate electrical connection of cable 901 to a portable two-way radio. As those skilled in the art will appreciate, side mounts can contain impedance matching electronics and are commonly used to attach microphones, speakers, and push-to-talk switches to portable two-way radios. A connector 912, for example, can be attached to the upper end of cable 901 to facilitate electrical connection of cable 901 to a speaker. Connector 912 can be a Hirose connector.

Figure 10:
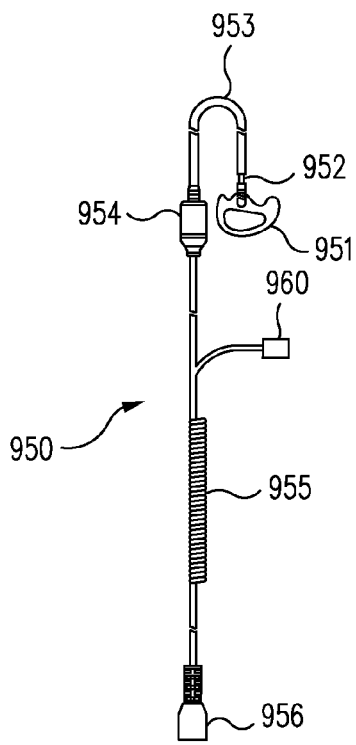
FIG. 10 is a semi-schematic view of an earpiece assembly, comprising a cable, a speaker, acoustic tubing, and an earpiece, that is suitable for use with the inline cable assembly of FIG. 9 so as to partially define a portable two-way radio system according to an exemplary embodiment of the present invention.

Referring now to FIG. 10, an example of an earpiece assembly 950 that is suitable for use with the push-to-talk switch of the present invention is shown. An electrical connector, such as a connector 956 facilitates electrical connection of an electrical cable 955 to a cable, such as cable 901 of inline cable assembly 900 of FIG. 9. Connector 956 can be a Hirose connector. A speaker 954 generates sound in response to received radio messages. Speaker 915 can be a miniature or button speaker similar to those commonly used in hearing aids. The sound is communicated via acoustic tubing 953 to earpiece 951. A barbed fitting 952, such as an elbow fitting, can be used to attach earpiece 951 to acoustic tubing 953. Earpiece 951 can be disposed in the conchae of a user's ear and directs sound from acoustic tubing 953 towards the user's eardrum.

Figure 11:
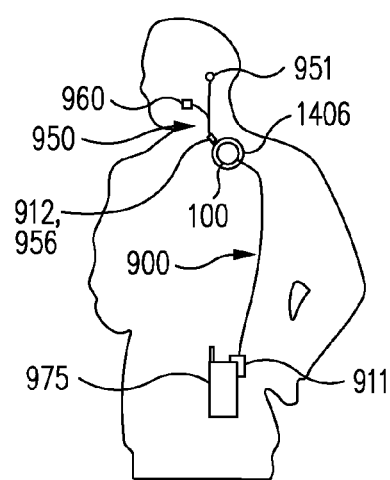
FIG. 11 is a semi-schematic view of a portable two-way radio system having a substantially silent push-to-talk switch as worn by a user, according to an example of an embodiment of the present invention.

Referring now to FIG. 11, a user can wear a portable two-way radio 975. Inline cable assembly 900 communicates electrical signals representative of received radio messages from portable two-way radio 975 to a speaker, as described above. Inline cable assembly 900 also communicates electrical signals representative of transmitted radio messages from a microphone 960 to portable two-way radio 975. Inline cable 900 also transmits a control signal from push-to-talk switch 100 to portable two-way radio 975 so as to facilitate the transmission of outgoing messages from the user.

Figure 12:
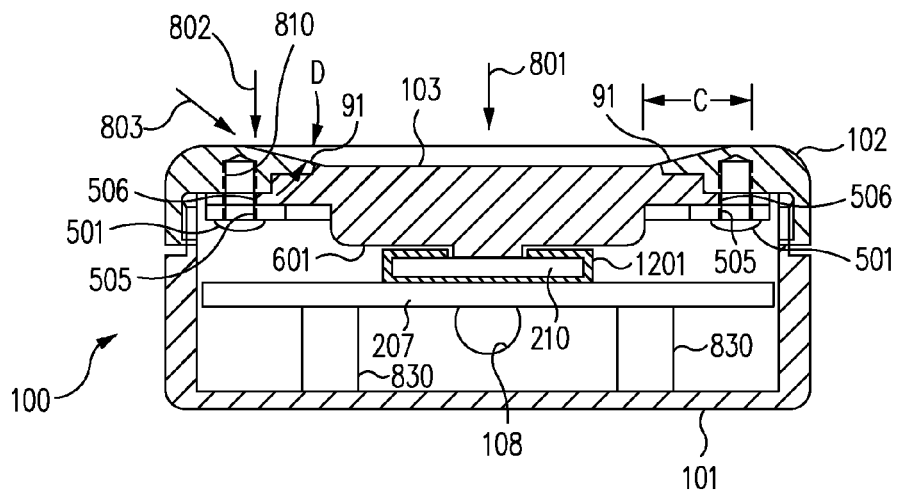
FIG. 12 is a semi-schematic cross-sectional view taken along line 8 of FIG. 1, showing sound damping/insulation around the switch so as to substantially mitigate sound produced thereby when actuated.

FIG. 12 shows sound damping/insulation 1201 around the switch 210. By placing sound damping/insulation 1201 around the switch 210, sound from the switch 210 can be substantially attenuated. Thus, a louder switch 210 can be used while still maintaining sound from the push-to-talk switch at an inaudible level. Further, the use of such sound damping/insulation can reduce noise if switch 210 malfunctions and becomes noisier.

Figure 13:
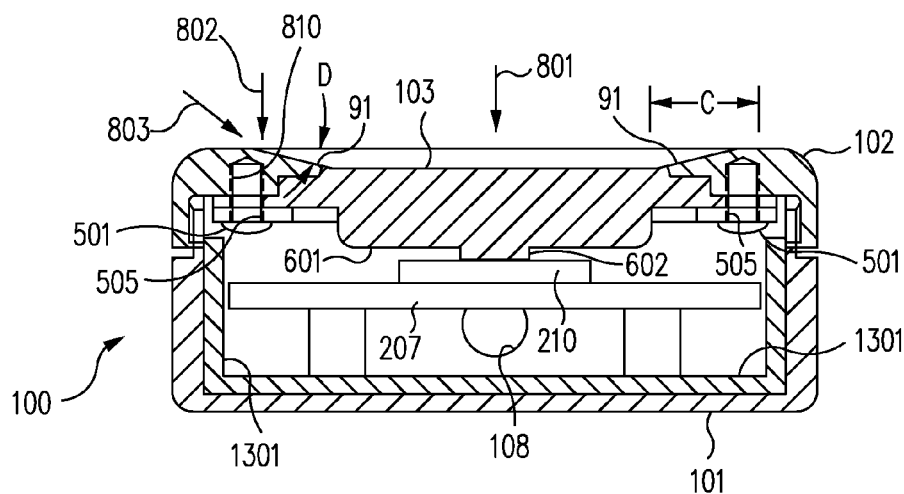
FIG. 13 is a semi-schematic cross-sectional view taken along line 8 of FIG. 1, showing sound damping/insulation along the walls of the housing so as to substantially mitigate sound produced by the switch when actuated.

FIG. 13 shows sound damping/insulation 1301 along the interior walls of housing 102. By placing sound damping/insulation 1301 along the interior walls of housing 102, sound from the switch 210 can be substantially attenuated. Thus, a louder switch 210 can be used while still maintaining sound from the push-to-talk switch at an inaudible level. Further, the use of such sound damping/insulation can reduce noise if switch 210 malfunctions and becomes noisier.

Figure 14:
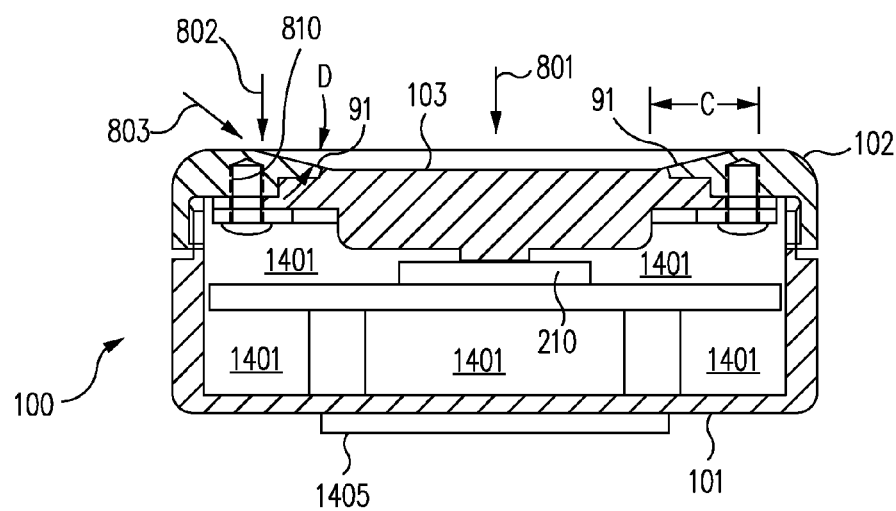
FIG. 14 is a semi-schematic cross-sectional view taken along line 8 of FIG. 1, showing voids within which sound damping/insulation can be disposed so as to substantially mitigate sound produced by the switch when the switch is actuated.

FIG. 14 shows that sound damping/insulation can be placed in voids 1401 of housing 102. By placing sound damping/insulation in voids of housing 102, sound from the switch 210 can be substantially attenuated. Thus, a louder switch 210 can be used while still maintaining sound from the push-to-talk switch at an inaudible level. Further, the use of such sound damping/insulation can reduce noise if switch 210 malfunctions and becomes noisier.

Any desired combination of sound damping/insulation 1201 around the switch 210, sound damping/insulation 1301 along the interior walls of housing 102, and sound damping/insulation placed in voids 1401 of housing 102 can be utilized. For example, sound damping/insulation 1201 around the switch 210, sound damping/insulation 1301 along the interior walls of housing 102, and sound damping/insulation placed in voids of housing 102 can be utilized.

Hook and loop fasteners, e.g., Velcro®, snaps, or other fastening mechanisms can be used to attach the push-to-talk switch to any desired part of a person's body, clothing, or equipment. For example, hook and loop fasteners 1405 can be formed to the lower surface of the push-to-talk switch and complimentary hook and loop fasteners 1406 (FIG. 11) can be formed to a desired location on a police officer's uniform. In this manner, the push-to-talk switch can easily and conveniently be attached to the police officer's uniform.

The push-to-talk switch can be configured as a ring to be worn upon a finger. The push-to-talk switch can be configured to attach to a ring that is worn upon a finger.

Figure 15:
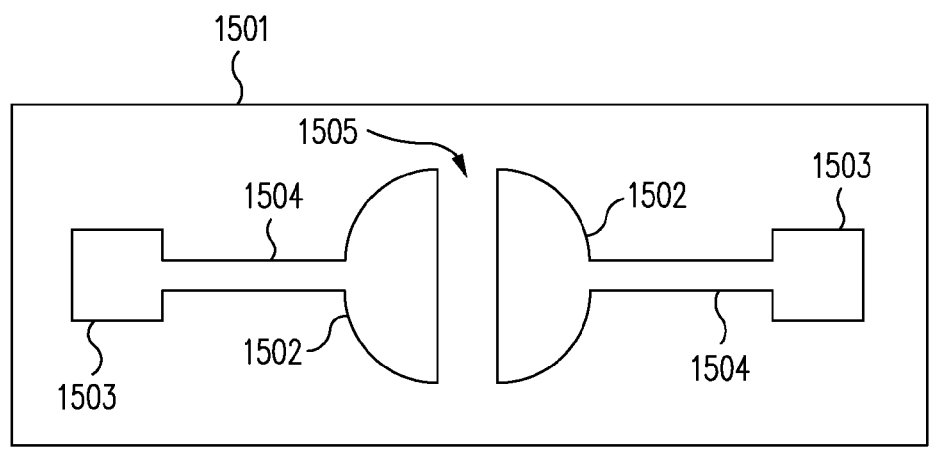
FIG. 15 is a top view of a contact switch according to an example of an embodiment of the present invention (not showing the diaphragm and metal contact of FIG. 16)
Figure 16:
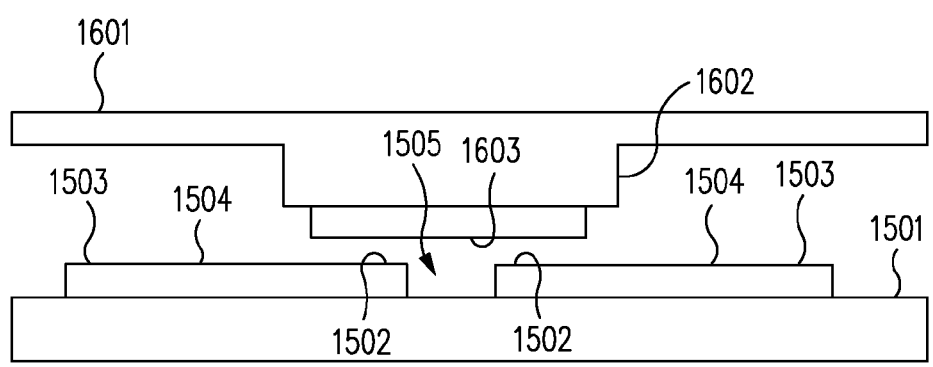
FIG. 16 is a side view of the contact switch of FIG. 15, showing the diaphragm and metal contact formed thereto.

Referring now to FIGS. 15 and 16, the switch can be a contact switch that comprises, for example, copper traces formed upon a substrate such as a printed circuit board 1501 to define two lower conductive contacts 1502, pads 1503, and conductive conduits 1504 interconnecting lower contacts 1502 and pads 1503. Pads 1503 can be used as solder pads or the like to facilitate electrical connection of the switch.

An upper conductive contact 1603 (shown in FIG. 16) can be formed upon a flexible diaphragm 1601 (which is analogous to diaphragm 401, for example), such that pushing the button of the push-to-talk switch causes the diaphragm 1601 to bend downwardly and thus causes the upper contact 1603 to bridge the gap 1505 so as to provide electrical connection between the lower contacts 1502 and thereby turn the switch on. In this manner, a very quiet switch can be formed.

According to an example of an embodiment of the present invention, a push-to-talk switch can be reduced substantially in size. Contemporary push-to-talk switches are approximately three inches in diameter. The diameter of a push-to-talk switch of the present invention can be one to two inches, or less. Such reduction in size can be facilitated, for example, by the sloped bezel 102 that makes the effective or target size of the switch larger as discussed above. Thus, a smaller push-to-talk switch can be as easy or easier to actuate since the user does not have to be as accurate in hitting the button 103 as with a contemporary push-to-talk switch.

The substantially silent push-to-talk switch of the present invention can be either a standalone push-to-talk switch or a push-to-talk switch that is built into or integrated with another device, such as a two-way radio or a microphone and/or speaker for a two-way radio.

In view of the foregoing, a push-to-talk switch that has enhanced reliability is provided. More particularly, the standalone push-to-talk switch of the present invention is more likely to operate properly regardless of how the button thereof is pushed. Thus, the amount of effort and/or fumbling done by a user in order to actuate the push-to-talk switch can be substantially mitigated. Further, because the push-to-talk switch is substantially silent, it can be used in application such as covert operations and battle situations where the sound of actuating the switch could have life threatening adverse consequences.

Embodiments described above illustrate, but do not limit, the invention. It should also be understood that numerous modifications and variations are possible in accordance with the principles of the present invention. Accordingly, the scope of the invention is defined only by the following claims.

The invention claimed is:
1. A push-to-talk switch, comprising:
a switch;
a bezel having a sloped portion;
a one-piece diaphragm molded of an elastomeric material and disposed proximate the switch, the diaphragm comprising:
a central portion,
an intermediate portion surrounding and supporting the central portion,
a peripheral portion surrounding and supporting the intermediate portion,
the central portion being thicker than the intermediate portion and defining a button that is sufficiently rigid to actuate the switch when the button is pushed by a user's finger,
the intermediate portion being thicker than the peripheral portion, and
the peripheral portion including a plurality of apertures for supporting and mounting the diaphragm to the bezel;

wherein a top surface of the button is substantially flush with the sloped portion of the bezel to define a substantially continuous recess adapted to receive the user's finger;

wherein the central portion of the diaphragm comprises an upper substantially disk-shaped structure that extends above the intermediate portion of the diaphragm toward the bezel to provide the to surface substantially flush with the sloped portion of the bezel; and wherein the central portion of the diaphragm comprises a lower substantially disk-shaped structure that extends below the intermediate portion of the diaphragm toward the switch to actuate the switch when the button is pushed by the user's finger.

2. The push-to-talk switch as recited in claim 1, wherein actuation of the switch provides tactile feedback.

3. The push-to-talk switch as recited in claim 1, further comprising a printed circuit board to which the switch is mounted.

4. The push-to-talk switch as recited in claim 1, further comprising:
a printed circuit board to which the switch is mounted; and
a housing within which the printed circuit board is disposed.

5. The push-to-talk switch as recited in claim 1, further comprising:
a printed circuit board to which the switch is mounted;
a housing within which the printed circuit board is disposed; and
wherein sufficient room is provided within the housing for an electrical cable to pass through the housing between the circuit board and the housing.

6. The push-to-talk switch as recited in claim 1, wherein the bezel is configured so as to guide the user's finger to the button.

7. The push-to-talk switch as recited in claim 1, further comprising an aluminum housing within which the switch is disposed.

8. The push-to-talk switch as recited in claim 1, further comprising a housing within which the switch is disposed and hook and loop fasteners formed to the housing.

9. The push-to-talk switch as recited in claim 1, wherein the bezel is configured so as to guide the user's finger to the button, the sloped portion has a width of between approximately 0.25 inch and approximately 1.5 inch.

10. The push-to-talk switch as recited in claim 1, wherein the bezel is configured so as to guide the user's finger to the button, the sloped portion has a width of approximately 0.75 inch.

11. The push-to-talk switch as recited in claim 1, wherein the bezel is configured so as to guide the user's finger to the button, the sloped portion has an angle of between approximately 35 degrees and approximately 55 degrees.

12. The push-to-talk switch as recited in claim 1, wherein the bezel is configured so as to guide the user's finger to the button, the sloped portion has an angle of approximately 45 degrees.

13. The push-to-talk switch as recited in claim 1, wherein the peripheral portion and the button are integrally formed.

14. The push-to-talk switch as recited in claim 1, wherein the diaphragm comprises a resilient polymer material.

15. The push-to-talk switch as recited in claim 1, wherein the diaphragm comprises rubber.

16. The push-to-talk switch as recited in claim 1, wherein the diaphragm is generally round.

17. The push-to-talk switch as recited in claim 1, wherein the peripheral portion is between approximately 0.010 inch and 0.100 inch thick.

18. The push-to-talk switch as recited in claim 1, wherein the peripheral portion is approximately 0.040 inch thick.

19. The push-to-talk switch as recited in claim 1, wherein the button is between approximately 0.10 inch and 035 inch thick.

20. The push-to-talk switch as recited in claim 1, wherein the button is approximately 0.25 inch thick.

21. The push-to-talk switch as recited in claim 1, further comprising an aluminum housing within which the switch is disposed, wherein the peripheral portion of the diaphragm seals the housing.

22. The push-to-talk switch as recited in claim 1, wherein the diaphragm further comprises a nipple extending downwardly from the central portion thereof and arranged to contact the switch when the button is pushed.

23. The push-to-talk switch as recited in claim 1, wherein:
the intermediate portion of the diaphragm comprises a substantially uniform annular structure surrounding the central portion of the diaphragm; and
the peripheral portion of the diaphragm comprises a substantially uniform annular structure surrounding the intermediate portion of the diaphragm.

24. The push-to-talk switch as recited in claim 23, wherein:
the sloped portion of the bezel is inclined relative to the top surface of the button at an angle of between approximately 35 degrees and approximately 55 degrees.

25. The push-to-talk switch as recited in claim 24, wherein:
the sloped portion of the bezel is inclined relative to the top surface of the button at an angle of approximately 45 degrees.

26. The push-to-talk switch as recited in claim 23, wherein the peripheral portion is between approximately 0.010 inch and 0.100 inch thick.

27. The push-to-talk switch as recited in claim 26, wherein the peripheral portion is approximately 0.040 inch thick.

28. The push-to-talk switch as recited in claim 23, wherein the button is between approximately 0.10 inch and 0.35 inch thick.

29. The push-to-talk switch as recited in claim 28, wherein the button is approximately 0.25 inch thick.

30. The push-to-talk switch as recited in claim 23, wherein the switch is a capacitive switch.

* * * * *